(12) United States Patent
Bortolini et al.

(10) Patent No.: US 7,155,084 B2
(45) Date of Patent: Dec. 26, 2006

(54) BIDIRECTIONAL WAVELENGTH CROSS CONNECT ARCHITECTURES USING WAVELENGTH ROUTING ELEMENTS

(75) Inventors: Edward J. Bortolini, Nederland, CO (US); Dirk Barthel, Westminster, CO (US); Robert T. Weverka, Boulder, CO (US); Samuel Paul Weaver, Boulder, CO (US); Paulo E. X. Silveira, Boulder, CO (US)

(73) Assignee: Altera Corporation, San Jose, CA (US)

( * ) Notice: Subject to any disclaimer, the term of this patent is extended or adjusted under 35 U.S.C. 154(b) by 238 days.

(21) Appl. No.: 10/150,810

(22) Filed: May 17, 2002

(65) Prior Publication Data

US 2003/0215178 A1 Nov. 20, 2003

(51) Int. Cl.
*G02B 6/28* (2006.01)
*H04B 10/08* (2006.01)

(52) U.S. Cl. ............................ 385/24; 385/16; 385/17; 385/18; 398/49

(58) Field of Classification Search ................ 385/16, 385/18, 17, 37; 398/50, 56, 48, 49; 359/128, 359/127, 117, 130, 124, 134, 139
See application file for complete search history.

(56) References Cited

U.S. PATENT DOCUMENTS

| | | | | |
|---|---|---|---|---|
| 5,446,809 A | * | 8/1995 | Fritz et al. ..................... 385/17 |
| 5,748,350 A | * | 5/1998 | Pan et al. ...................... 385/37 |
| 5,953,141 A | * | 9/1999 | Liu et al. ....................... 398/83 |
| 5,960,133 A | * | 9/1999 | Tomlinson .................... 385/18 |
| 6,108,471 A | * | 8/2000 | Zhang et al. ................. 385/37 |
| 6,208,443 B1 | * | 3/2001 | Liu et al. ....................... 398/9 |
| 6,275,630 B1 | * | 8/2001 | Yang et al. ................... 385/37 |
| 6,307,653 B1 | * | 10/2001 | Bala et al. ..................... 398/2 |
| 6,449,073 B1 | * | 9/2002 | Huber ......................... 385/16 |
| 6,501,877 B1 | * | 12/2002 | Weverka et al. .............. 385/31 |
| 6,597,481 B1 | * | 7/2003 | Fatehi et al. ................. 398/82 |
| 6,690,853 B1 | * | 2/2004 | Alaimo et al. ............... 385/24 |
| 2001/0038478 A1 | * | 11/2001 | Hwang ...................... 359/124 |
| 2002/0171890 A1 | * | 11/2002 | Lin et al. ................... 359/124 |
| 2002/0176658 A1 | * | 11/2002 | Prohaska ..................... 385/18 |
| 2002/0196549 A1 | * | 12/2002 | Randall et al. ............. 359/578 |
| 2003/0161574 A1 | * | 8/2003 | Aksyuk et al. ............... 385/16 |
| 2003/0174958 A1 | * | 9/2003 | Cizek et al. .................. 385/47 |
| 2004/0028319 A1 | * | 2/2004 | Ajgaonkar et al. .......... 385/16 |
| 2004/0067011 A1 | * | 4/2004 | Kim et al. ................... 385/17 |
| 2004/0100684 A1 | * | 5/2004 | Jones et al. ............ 359/337.11 |

OTHER PUBLICATIONS

U.S. Appl. No. 10/093,844, Edward J. Bortolini et al.
U.S. Appl. No. 10/093,843, Edward J. Bortolini.

* cited by examiner

*Primary Examiner*—Frank G. Font
*Assistant Examiner*—James P. Hughes
(74) *Attorney, Agent, or Firm*—Townsend and Townsend and Crew LLP

(57) ABSTRACT

Bidirectional wavelength cross connects include a plurality of ports, each configured to receive an input optical signals, each input optical signal having a plurality of spectral bands. At least one of the plurality of ports is disposed to simultaneously transmit an output optical signal having at least one of the spectral bands. A plurality of wavelength routing elements are configured to selectively route input optical signal spectral bands to output optical signals.

30 Claims, 13 Drawing Sheets

BIDIRECTIONAL WAVELENGTH CROSS CONNECT ARCHITECTURES USING WAVELENGTH ROUTING ELEMENTS

CROSS-REFERENCES TO RELATED APPLICATIONS

This application is related to copending, commonly assigned U.S. patent application Ser. No. 10/093,844 entitled "OPTICAL WAVELENGTH CROSS CONNECT ARCHITECTURES USING WAVELENGTH ROUTING ELEMENTS" by Edward J. Bortolini, Dirk Barthel, Robert T. Weverka, Rainer Iraschko, and George David Morley, filed Mar. 8, 2002, and to copending, commonly assigned U.S. patent application Ser. No. 10/093,843 entitled "METHODS FOR PERFORMING IN-SERVICE UPGRADES OF OPTICAL WAVELENGTH CROSS CONNECTS" by Edward J. Bortolini, filed Mar. 8, 2002, the entire disclosures of each of which are herein incorporated by reference in their entirety for all purposes.

BACKGROUND OF THE INVENTION

This application relates generally to fiber-optic communications. This application relates more specifically to optical wavelength cross-connect architectures used in fiber-optics applications.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However, multi-wavelength systems generally require multiple SONET/SDH systems operating in parallel to process the many optical channels. This makes it difficult and expensive to scale DWDM networks using SONET/SDH technology. The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable.

Optical wavelength cross connects are configured generally to redirect the individual optical channels on a plurality of input optical fibers to a plurality of output optical fibers. Each incoming channel may be directed to any of the output optical fibers depending on a state of the cross connect. Thus, where there are P input fibers and Q output fibers, the optical wavelength cross connect between them may be considered to be a "PN×QN optical switch." Sometimes herein, the terminology "P×Q optical wavelength cross connect" is used to refer to such a cross connect by referring to the numbers of input and output optical fibers, each of which is understood to have the capacity for carrying N channels. As such the "P×Q optical wavelength cross connect" terminology may be considered shorthand for describing an arbitrarily configurable PN×QN optical device.

FIG. 1 provides an example of a prior-art 4×4 optical wavelength cross connect 100 for a DWDM system carrying N individual wavelength channels. Each of the N channels on the four input signals 104 may be redistributed in accordance with a state of the cross connect 100 among the four output signals 116. The cross connect 100 functions by splitting each of the input signals 104($i$) with an optical demultiplexer 108($i$) into N signals 120(1 ... N, i) that carry only a single wavelength channel $\lambda_{1 \ldots N}$. From each of the optical demultiplexers 108, the signal corresponding to a particular one of the wavelength channels is directed to a respective one of N 4×4 optical space switches 110($j$). Each optical space switch 110 may be configured as desired to redirect the four received signals 120 to four transmitted signals 124. The transmitted signals 124 are transmitted to optical multiplexers 112 that recombine the reordered individual-wavelength signals onto the four output signals 116.

The efficiency of an arrangement such as shown in FIG. 1 is limited because it adopts a brute-force-type approach of demultiplexing the four incoming signals into their individual 4N components in order to reroute them. There is a general need in the art for more efficient optical wavelength cross-connect architectures without compromising complete routing flexibility.

BRIEF SUMMARY OF THE INVENTION

Embodiments of the present invention thus provide such efficient optical wavelength routing elements. In one set of embodiments, a bidirectional wavelength cross connect includes a plurality of optically interconnected wavelength routing elements configured to multiplex selective ones of a plurality of spectral bands to an output optical signal and to direct the output optical signal to one of a plurality of ports. The spectral bands are comprised by a plurality of input optical signals, each input optical signal being received at respective ones of the plurality of ports. Thus, the bidirectional nature of these embodiments leads to smaller, less expensive cross connect architectures.

Ones of these embodiments may also include at least one circulator disposed to receive one of the plurality of input optical signals, route the one of the plurality of input optical signal to one of the ports, receive from the one of the ports the output optical signal, and transmit the output optical signal. One of the wavelength routing elements may include a four-pass wavelength routing element. One of the wavelength routing elements may include a two-pass wavelength routing element. The bidirectional wavelength cross connect may also include a plurality of optical couplers, each disposed to intercept one of the input optical signals and to transmit an equivalent of such one of the input optical signals to at least two of the plurality of wavelength routing elements. One of the plurality of wavelength routing elements may be comprised by a protection fabric, and a remainder of the plurality of wavelength routing elements may be comprised by a working fabric, in which case the bidirectional wavelength cross connect may also include at least one working optical switch configured to transmit the output optical signal either as a working signal received from the working fabric or as a protection signal received from the protection fabric. The protection fabric may include includes a protection optical switch disposed to transmit the protection signal to one of the working optical switches, depending upon a state of the protection optical switch. The at least one wavelength routing element comprised by the protection fabric may be disposed to receive an equivalent of at least one of the input signals and to transmit the protection signal with spectral bands corresponding to desired spectral bands on the output optical signal, depending on the state of that wavelength routing element.

In another set of embodiments, a K×K bidirectional wavelength cross connect includes K ports configured to receive input optical signals, each input optical signal comprising a plurality of spectral bands. At least one of the ports is disposed to transmit an output optical signal comprising at least one of the spectral bands. The K×K bidirectional wavelength cross connect also includes a plurality of optically interconnected wavelength routing elements configured to selectively route input optical signal spectral bands to output optical signals. The K×K bidirectional wavelength cross connect may also include K circulators, each disposed to receive one of the input optical signals, route the one of the input optical signals to one of the ports, receive from the port one of the output optical signals, and transmit the one of the output optical signals. One of the wavelength routing elements may include a four-pass wavelength routing element. One of the wavelength routing elements may include a two-pass wavelength routing element. The K×K bidirectional wavelength cross connect may also include a plurality of optical couplers, each disposed to intercept one of the input optical signals and to transmit an equivalent of such one of the input optical signals to at least two of the plurality of wavelength routing elements. One of the plurality of wavelength routing elements may be comprised by a protection fabric, and a remainder of the plurality of wavelength routing elements may be comprised by a working fabric, in which case the bidirectional wavelength cross connect also may include a plurality of working optical switches, each configured to transmit a respective one of the output optical signals either as a working signal received from the working fabric or as a protection signal received from the protection fabric. The protection fabric may include a protection optical switch disposed to transmit the protection signal to one of the working optical switches, depending upon a state of the protection optical switch. One wavelength routing element comprised by the protection fabric may be disposed to receive an equivalent of at least one of the input signals and to transmit the protection signal with spectral bands corresponding to desired spectral bands on one of the output optical signals, depending on the state of that wavelength routing element.

In another set of embodiments, a K×K bidirectional wavelength cross connect includes a plurality K of 1:(K−1) optical couplers, each configured to receive one of a plurality of input optical signals. Each of the plurality of input optical signals includes a plurality of spectral bands. The K×K bidirectional wavelength cross connect also includes a plurality $$\frac{K(K-1)}{2}$$

of wavelength blockers, each wavelength blocker having at least two wavelength blocker ports. Each optical coupler is configured to transmit (K−1) substantial equivalents of one of the plurality of input optical signals to (K−1) wavelength blockers, to receive an output optical signal from each of the (K−1) wavelength blockers, and to transmit a composite output signal. The wavelength blockers are configured to receive two of the substantial equivalents of the plurality of input optical signals from two different optical couplers, selectively to block spectral bands from the substantial equivalents of the plurality of input optical signals, and to transmit output optical signals to the two different optical couplers. The K×K bidirectional wavelength cross connect also may include K circulators, each disposed to receive one of the plurality of input optical signals, route the one of the input optical signals to one of the couplers, receive from the coupler a composite output signal, and transmit the composite output signal. One of the wavelength routing elements may include a four-pass wavelength routing element. One of the wavelength routing elements may include a two-pass wavelength routing element.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

Figure 1:
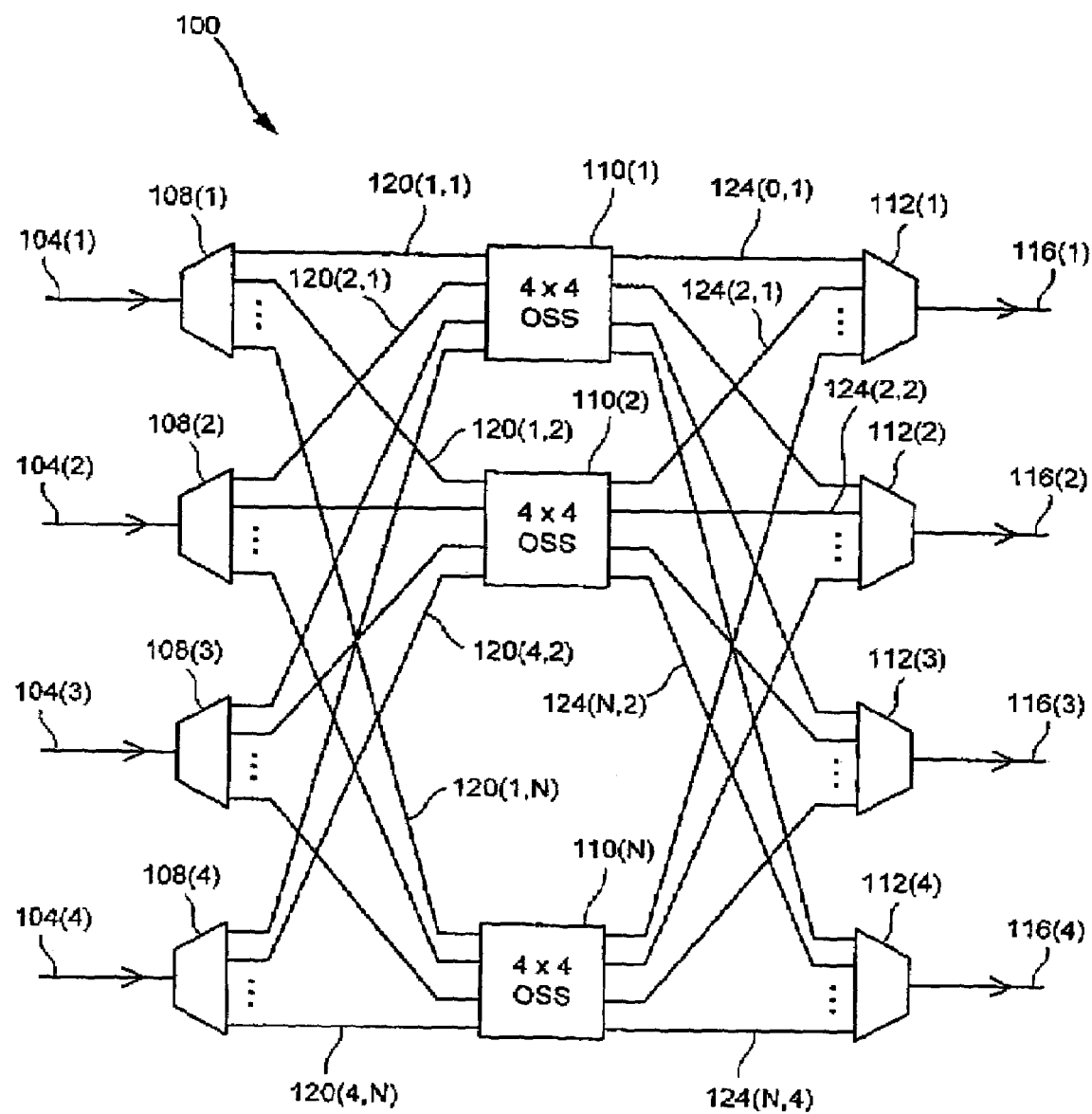
FIG. 1 is a schematic diagram illustrating a prior-art cross connect used in DWDM applications.

The following description sets forth embodiments of optical wavelength cross-connect architectures according to the invention. The general operation of such cross-connect architectures is to receive P input signals at respective input ports and output Q output signals at respective output ports. Each of the input and output signals comprises a plurality of spectral bands, with the cross connect capable of achieving a configuration that results in a desired redistribution of input spectral bands corresponding to equivalent channels among the output signals. Although the signals could each have a continuous spectrum, adjacent segments of which could be considered different spectral bands, it is generally contemplated that the spectrum of the incoming light will have a plurality of spaced bands, denoted as corresponding to channels 1, 2, 3, . . . N. In some instances, the examples provided herein focus on symmetric cross connects in which P=Q, but this is not a requirement and embodiments of the invention may readily be adapted to nonsymmetric cross connects also.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. The optical character of the system also permits the input ports and output ports to be interchanged functionally, permitting, for example, a P×Q element to be used as a Q×P element.

The International Telecommunications Union (ITU) has defined a standard wavelength grid having a frequency band centered at 194,100 GHz, and another band at every 50 GHz interval around 194,100 GHz. This corresponds to a wavelength spacing of approximately 0.4 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 100 GHz (corresponding to wavelength spacings of approximately 0.2 nm and 0.8 nm) are also of interest.

2. Wavelength Routing Element

Embodiments of the invention for an optical wavelength cross connect include one or more wavelength routing elements ("WRE"). As used herein, a "1×L WRE" refers to an optical device that receives multiplexed light at a WRE input port and redirects subsets of the spectral bands comprised by the multiplexed light to respective one or ones L of WRE output ports. Such a 1×L WRE may be operated as an L×1 WRE by interchanging the functions of the input and output ports. Specifically, a plurality L of optical signals, each multiplexed according to the same wavelength grid are provided at the L output ports (functioning as input ports). A single optical signal is output at the input port (functioning as an output port) and includes spectral bands selected from the L multiplexed optical signals according to the wavelength grid. Thus, the single output optical signal has, at each position on the wavelength grid, no more than one spectral band received at the same position on the wavelength grid from the L multiplexed optical signals. Accordingly, reference herein to a WRE adapted for routing wavelength components "between" a first optical signal and a plurality of second optical signals is intended to include a WRE configured to operate as a 1×L WRE or a WRE configured to operate as an L×1 WRE.

In a special case, WREs may be configured as "wavelength blockers" that pass only selected wavelengths from an input port to an output port. In such cases, the wavelength blockers may be 1×2 WREs with no connection to one of the two output ports. Alternatively, for example, wavelength blockers may be 1×1 WREs having an OFF position. WREs having an OFF position are more fully explained in commonly assigned U.S. patent application Ser. No. 10/099,392, entitled "ONE-TO-M WAVELENGTH ROUTING ELEMENT," by Nicholas Charles Cizek, filed on Mar. 13, 2002, which application is incorporated herein by reference in its entirety.

Embodiments for the cross connects that use a WRE may generally use any configuration for routing subsets of a plurality of spectral bands that achieve these functions. In some instances, a particular WRE may be provided in a one-pass, two-pass, four-pass, or other configuration. Some examples of suitable WREs are described in detail below, and additional examples of WREs that may be comprised by certain embodiments are described in the copending, commonly assigned U.S patent application, filed Nov. 16, 1999 and assigned Ser. No. 09/442,061 ("the '061 application"), entitled "WAVELENGTH ROUTER," by Robert T. Weverka et al., which is herein incorporated by reference in its entirety, including the Appendix, for all purposes.

In some embodiments, wavelength routing functions within the WRE may be performed optically with a free-space optical train disposed between the WRE input port and the WRE output ports, and a routing mechanism. The free-space optical train can include air-spaced elements or can be of generally monolithic construction. The optical train includes a dispersive element such as a diffraction grating. The routing mechanism includes one or more routing elements and cooperates with the other elements in the optical train to provide optical paths that couple desired subsets of the spectral bands to desired WRE output ports. The routing elements are disposed to intercept the different spectral bands after they have been spatially separated by their first encounter with the dispersive element.

Figure 2A:
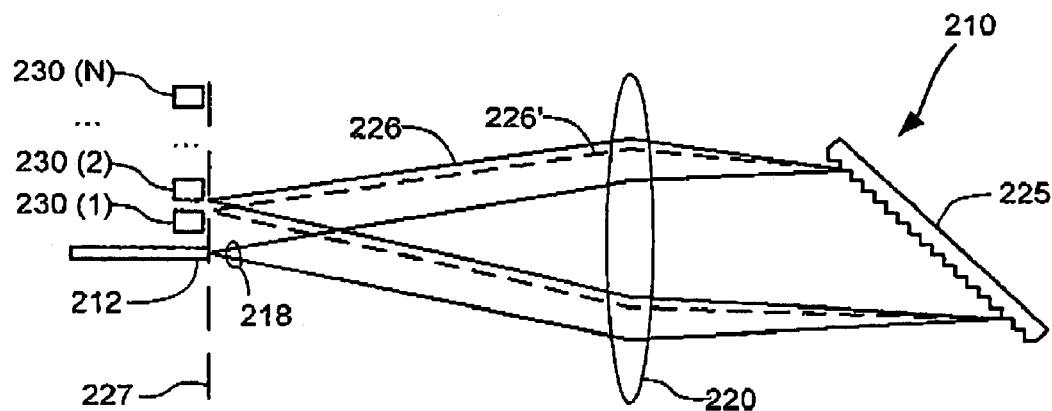
FIGS. 2A, 2B, and 2C are schematic top, side, and end views, respectively, of an optical wavelength routing element used in certain embodiments of the invention.
Figure 2B:
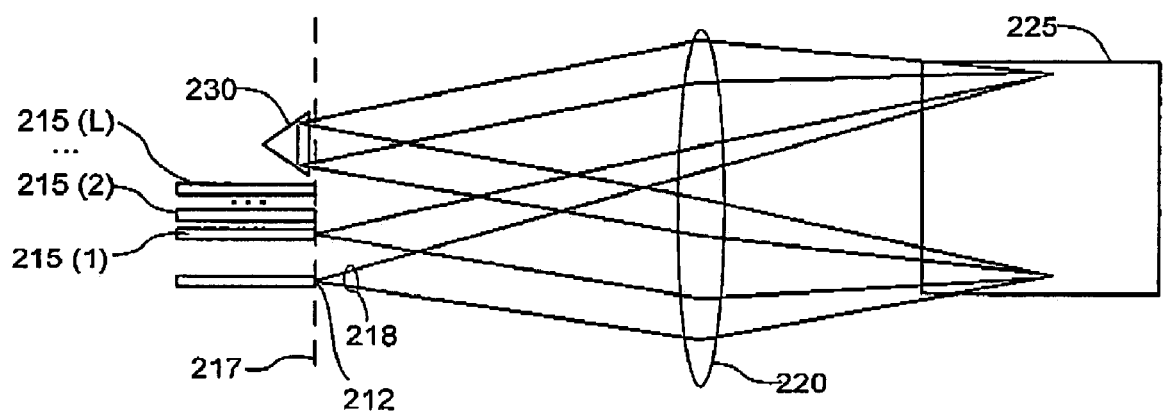
Figure 2C:
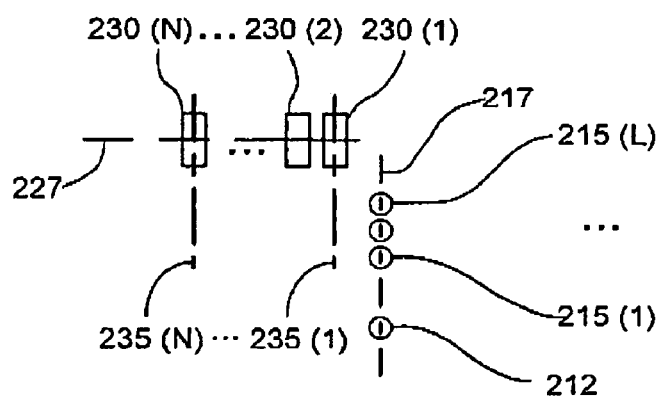

FIGS. 2A, 2B, and 2C are schematic top, side, and end views, respectively, of one embodiment of a 1×L (or, equivalently, L×1) WRE 210. This embodiment may be considered to be a four-pass WRE. Its general functionality is to accept light having a plurality N of spectral bands at a WRE input port 212, and to direct subsets of the spectral bands to desired ones of a plurality L of WRE output ports, designated 215(1) . . . 215(L). The output ports are shown in the end view of FIG. 2C as disposed along a line 217 that extends generally perpendicular to the top view of FIG. 2A. Light entering the WRE 10 from WRE input port 212 forms a diverging beam 218, which includes the different spectral bands. Beam 218 encounters a lens 220 that collimates the light and directs it to a reflective diffraction grating 225. The grating 225 disperses the light so that collimated beams at different wavelengths are directed at different angles back towards the lens 220.

Two such beams are shown explicitly and denoted 226 and 226', the latter drawn in dashed lines. Since these collimated beams encounter the lens 220 at different angles, they are focused towards different points along a line 227 in a transverse plane extending in the plane of the top view of FIG. 2A. The focused beams encounter respective ones of a plurality of retroreflectors, designated 230(1) . . . 230(A), located near the transverse plane. Various examples of micromirror configurations that may be used as part of the retroreflectors, among others, are described in the following copending, commonly assigned applications, each of which is herein incorporated by reference in its entirety for all purposes: U.S. patent application Ser. No. 09/898,988, entitled "SYSTEMS AND METHODS FOR OVERCOMING STICTION USING A LEVER," filed Jul. 3, 2001 by Bevan Staple et al.; U.S. patent application Ser. No. 09/899,000, entitled "FREE-SPACE OPTICAL WAVELENGTH ROUTER BASED ON STEPWISE CONTROLLED TILTING MIRRORS," filed Jul. 3, 2001 by Victor Buzzetta et al.; U.S. patent application Ser. No. 09/899,001, entitled "TWO-DIMENSIONAL FREE-SPACE OPTICAL WAVELENGTH ROUTER BASED ON STEPWISE CONTROLLED TILTING MIRRORS," filed Jul. 3, 2001 by Victor Buzzetta; U.S. patent application Ser. No. 09/899,002, entitled "MEMS-BASED, NONCONTACTING, FREE-SPACE OPTICAL SWITCH," filed Jul. 3, 2001 by Bevan Staple and Richard Roth; U.S. patent application Ser. No. 09/899,004, entitled "BISTABLE MICROMIRROR WITH CONTACTLESS STOPS," filed Jul. 3, 2001 by Lilac Muller; U.S. patent application Ser. No. 09/899,014, entitled "METHODS AND APPARATUS FOR PROVIDING A MULTI-STOP MICROMIRROR," filed Jul. 3, 2001 by David Paul Anderson; and U.S. patent application Ser. No. 09/941,998, entitled "MULTIMIRROR STACK FOR VERTICAL INTEGRATION OF MEMS DEVICES IN TWO-POSITION RETROREFLECTORS," filed Aug. 28, 2001 by Frederick Kent Copeland.

The beams are directed back, as diverging beams, to the lens 220 where they are collimated, and directed again to the grating 225. On the second encounter with the grating 225, the angular separation between the different beams is removed and they are directed back to the lens 220, which focuses them. The retroreflectors 230 may be configured to send their intercepted beams along a reverse path displaced along respective lines 235(1) . . . 235(N) that extend generally parallel to line 217 in the plane of the side view of FIG. 2B and the end view of FIG. 2C, thereby directing each beam to one or another of WRE output ports 215.

Figure 3A:
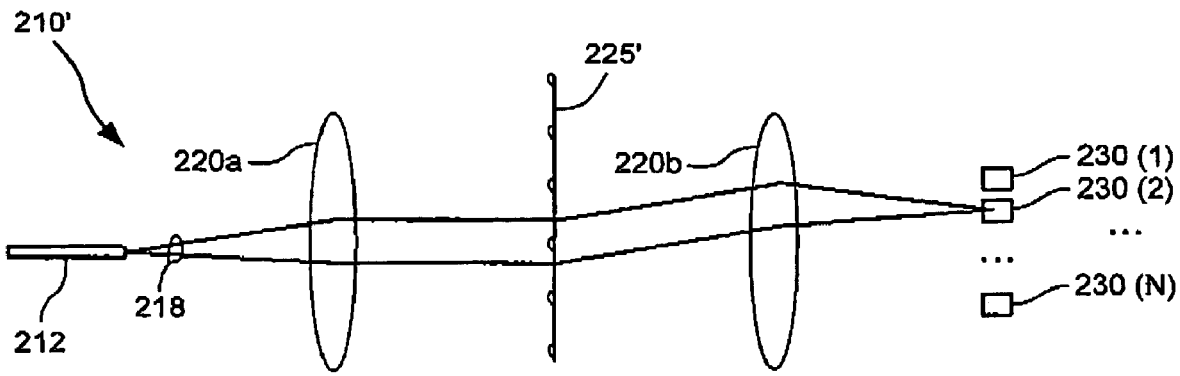
FIGS. 3A and 3B are schematic top and side views, respectively, of an optical wavelength routing element used in certain embodiments of the invention.
Figure 3B:
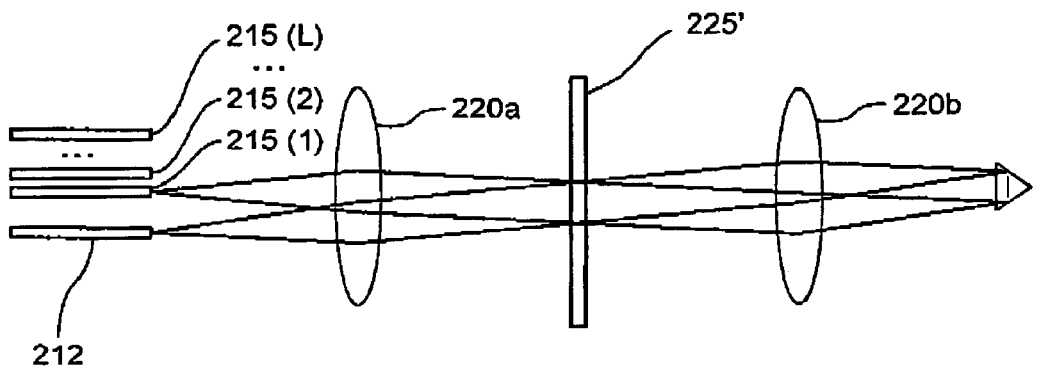

Another embodiment of a WRE, designated 210', is illustrated with schematic top and side views in FIGS. 3A and 3B, respectively. This embodiment may be considered an unfolded version of the embodiment of FIGS. 2A–2C and operates as a two-pass WRE. Light entering the WRE 10' from WRE input port 212 forms diverging beam 218, which includes the different spectral bands. Beam 218 encounters a first lens 220a, which collimates the light and directs it to a transmissive grating 225'. The grating 225' disperses the light so that collimated beams at different wavelengths encounter a second lens 220b, which focuses the beams. The focused beams are reflected by respective ones of plurality of retroreflectors 230, which may also be configured as described above, as diverging beams, back to lens 220b, which collimates them and directs them to grating 225'. On the second encounter, the grating 225' removes the angular separation between the different beams, which are then focused in the plane of WRE output ports 215 by lens 220a.

Figure 4:
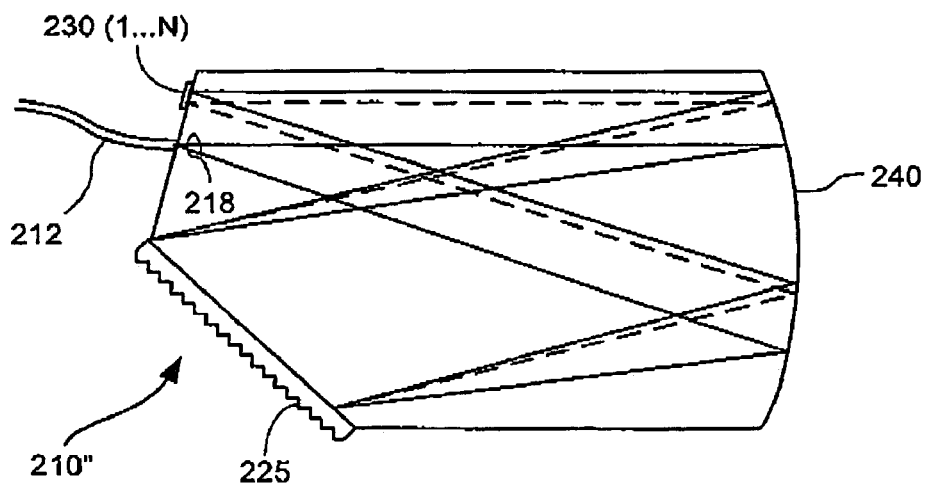
FIG. 4 is a schematic top view of an optical routing element according to a third embodiment of the invention.

A third embodiment of a WRE, designated 210", is illustrated with the schematic top view shown in FIG. 4. This embodiment is a further folded version of the embodiment of FIGS. 2A–2C, shown as a solid glass embodiment that uses a concave reflector 240 in place of lens 220 of FIGS. 2A–2C or lenses 220a and 220b of FIGS. 3A–3B. Light entering the WRE 210" from input port 212 forms diverging beam 218, which includes the different spectral bands. Beam 218 encounters concave reflector 240, which collimates the light and directs it to reflective diffraction grating 225, where it is dispersed so that collimated beams at different wavelengths are directed at different angles back towards concave reflector 240. Two such beams are shown explicitly, one in solid lines and one in dashed lines. The beams then encounter retroreflectors 230 and proceed on a return path, encountering concave reflector 240, reflective grating 225', and concave reflector 240, the final encounter with which focuses the beams to the desired WRE output ports. Again, the retroreflectors 230 may be configured as described above.

3. Cross-Connect Building Blocks

Architectures for large cross connects made in accordance with certain embodiments of the invention use L×1 optical elements that include one or more WREs. Such an element is referred to generically herein as an "L×1 WRE," including arrangements that have more than one WRE, provided at least one WRE is comprised by the element. Thus, one example of an embodiment of an L×1 WRE that may be used in cross-connect architectures according to the invention is a single structure that has one input (output) port and L output (input) ports. Other embodiments of an L×1 WRE comprised of smaller WREs are illustrated in FIGS. 5A–5D.

Figure 5A:
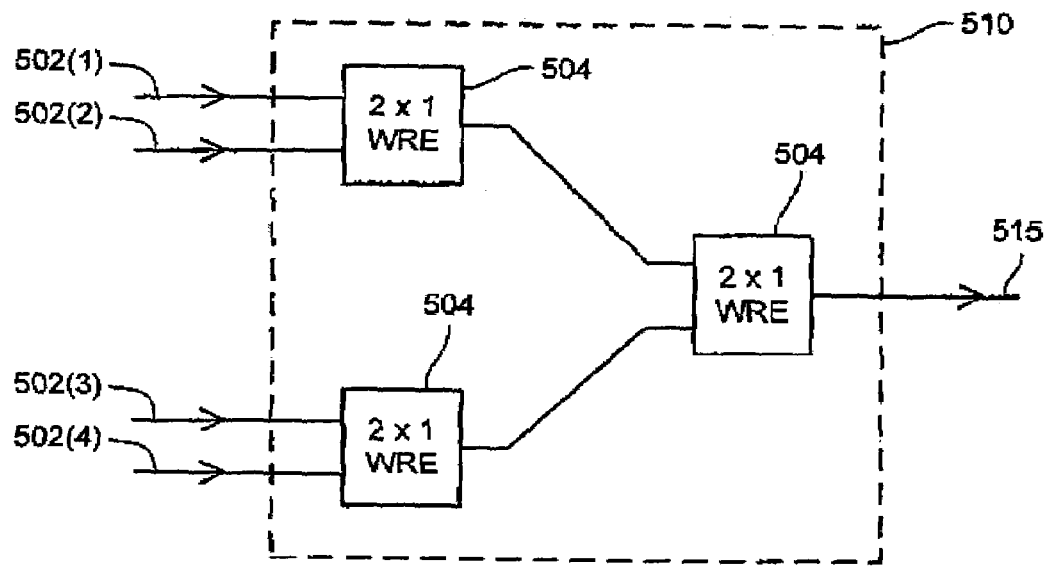
FIGS. 5A–5D are schematic diagrams showing examples of L×1 cross-connect building blocks that include wavelength routing elements in accordance with embodiments of the invention.

For example, FIG. 5A shows how a 4×1 WRE 510 may be configured with three 2×1 WREs. Each of the 2×1 WREs used in any of these embodiments may be configured as one of the WREs described in the '061 application or may be configured according to another WRE design. The 4×1 WRE 510 accepts four input signals 502 and outputs a single output signal 515. The four input signals 502 are received in pairs by two of the 2×1 WREs 504. The outputs from the 2×1 WREs 504 are used as inputs to the third 2×1 WRE, which output the output signal 515.

This arrangement of 2×1 WREs may thus be considered to be a tree arrangement. At each level of the tree, the number of distinct spectral bands across all optical signals at that level is reduced by the action of the 2×1 WREs 504 until, at the final level, only the desired spectral bands remain on the output signal 535. The resulting 4×1 WRE 510 thus functions according to the definition provided above for the operation of a WRE by mapping selected spectral bands from each of the input signals 502 according to a wavelength grid.

The embodiment of FIG. 5A may also be used as a 1×4 WRE to perform the reverse mapping according to the wavelength grid by interchanging the functions of the input and output ports. In such an instance, spectral bands originating on the single input signal are progressively directed to the desired ones of the plurality of output signals by separating them with the 2×1 WREs 504 at each level of the tree. It is thus evident for a 1×4 WRE (and more generally for a 1×L WRE) that certain wavelength-grid positions of at least some of the output signals will be inactive by carrying no spectral bands.

Figure 5B:
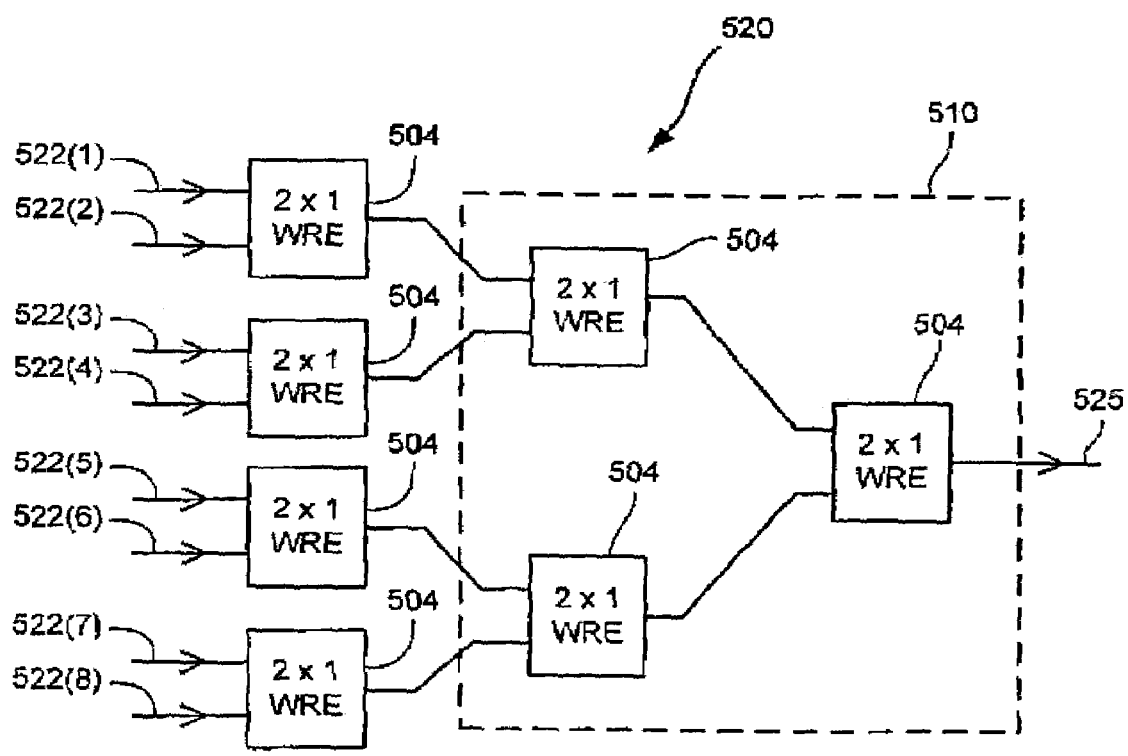

FIG. 5B shows an extension of the tree arrangement of 2×1 WREs 504 to an architecture that provides an 8×1 WRE 520. Spectral bands from eight input signals 522 are routed according to a unique wavelength-grid assignment to a single output signal 525. The eight input signals 522 are received in pairs by four 2×1 WREs 504, and the four outputs from those 2×1 WREs are received by the 4×1 WRE 510 shown in FIG. 5A. The resulting 8×1 WRE 520 functions according to the definition provided above for the operation of a WRE by mapping selected spectral bands from each of the input signals 522 according to a wavelength grid. It may also be used as a 1×8 WRE to perform the reverse mapping according to the wavelength grid by interchanging the functions of the input and output ports.

It is evident that larger WREs may be configured by including more layers in the tree. Adding still another layer of 2×1 WREs to the 8×1 WRE of FIG. 5B results in a 16×1 WRE. More generally, for a tree having p full layers of 2×1 WREs, the resulting element functions as a $2^p \times 1$ WRE, mapping spectral bands from $2^P$ input signals according to a wavelength grid onto a single output port. Such an element may alternatively be used as a $1 \times 2^P$ WRE to perform the reverse mapping according to the wavelength grid by interchanging the functions of the input and output ports.

Figure 5C:
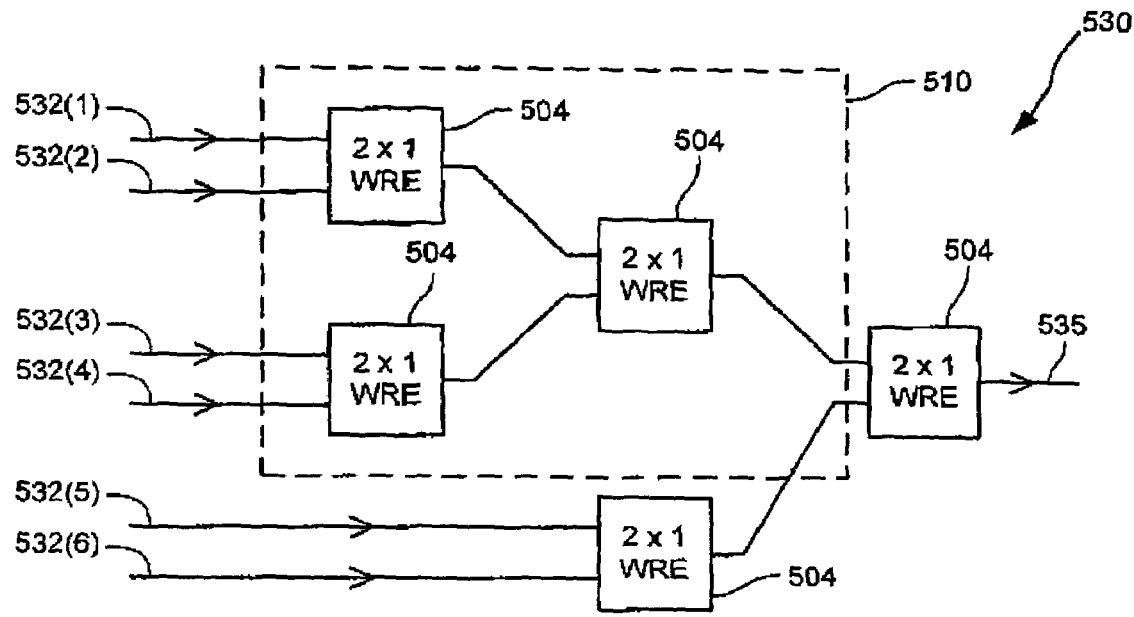

It is not necessary that every level of the tree be completely filled with 2×1 WREs. For example, FIG. 5C provides a schematic illustration of an embodiment similar to that of FIG. 5B except that two of the 2×1 WREs 504 at the widest level of the tree have been removed. Accordingly, this embodiment functions as a 6×1 WRE 530 that maps selected spectral bands from each of six input signals 532 according to a wavelength grid onto a single output signal 535. Interchanging the functions of input and output ports results in a reverse mapping according to the wavelength grid so that element 530 functions as a 1×6 WRE. It is noted by showing the component 4×1 WRE 510 with the dashed line that this embodiment may alternatively be considered as a configuration having a complete tree, but with different sizes of WREs on a given level. The 6×1 WRE 530 shown comprises a tree having a 4×1 WRE 510 and a 2×1 WRE 504 on its widest level, these WREs feeding into a 2×1 WRE 504 at the top level.

Figure 5D:
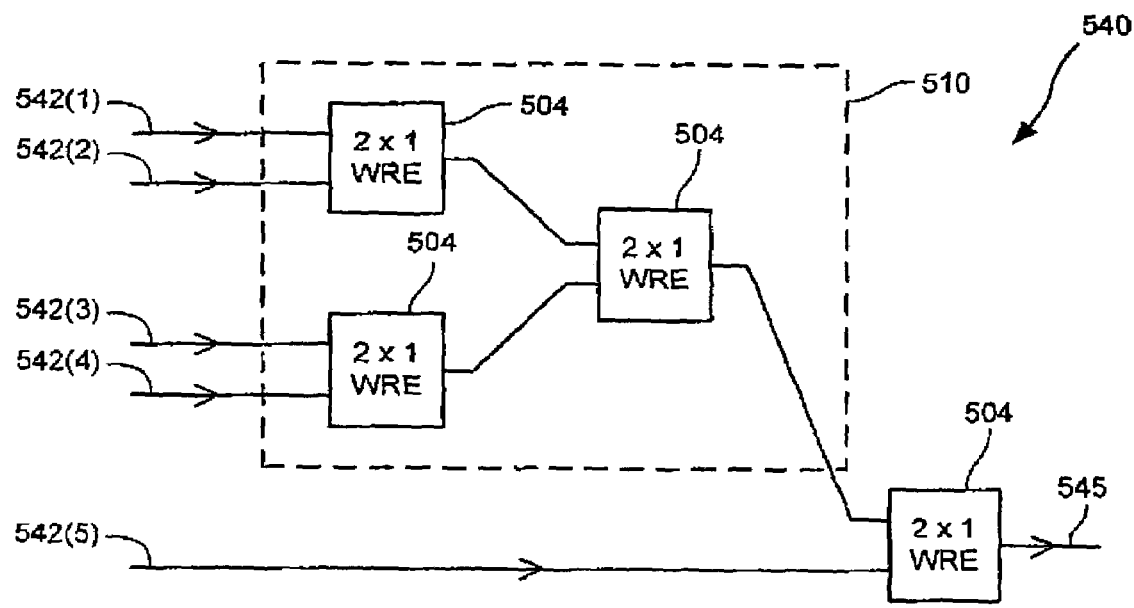

Similarly, FIG. 5D eliminates some 2×1 WREs 504 from two levels of the tree when compared with FIG. 5B. The illustrated embodiment functions as a 5×1 WRE 540 by mapping selected spectral bands from each of five input signals 542 according to a wavelength grid onto a single output signal 545. As for the other embodiments, element 540 may function as a 1×5 WRE by interchanging the functions of the input and output ports. Also, like the embodiment shown in FIG. 5C, element 540 may be considered as having WREs of different sizes, specifically in this example of comprising a 4×1 WRE 510 and a 2×1 WRE 504.

It is evident that various other combinations may be made according to the principles described with respect to FIGS. 5A–5D to produce L×1 and 1×L WREs for any value of L. Further, L×1 and 1×L WREs may be used as building blocks to form P×Q WRE's for values of P and Q other than 1, including configurations where P=Q, which will be referred to herein as K×K configurations. Illustrations of such configurations are provided by FIGS. 6A–6J.

Figure 6A:
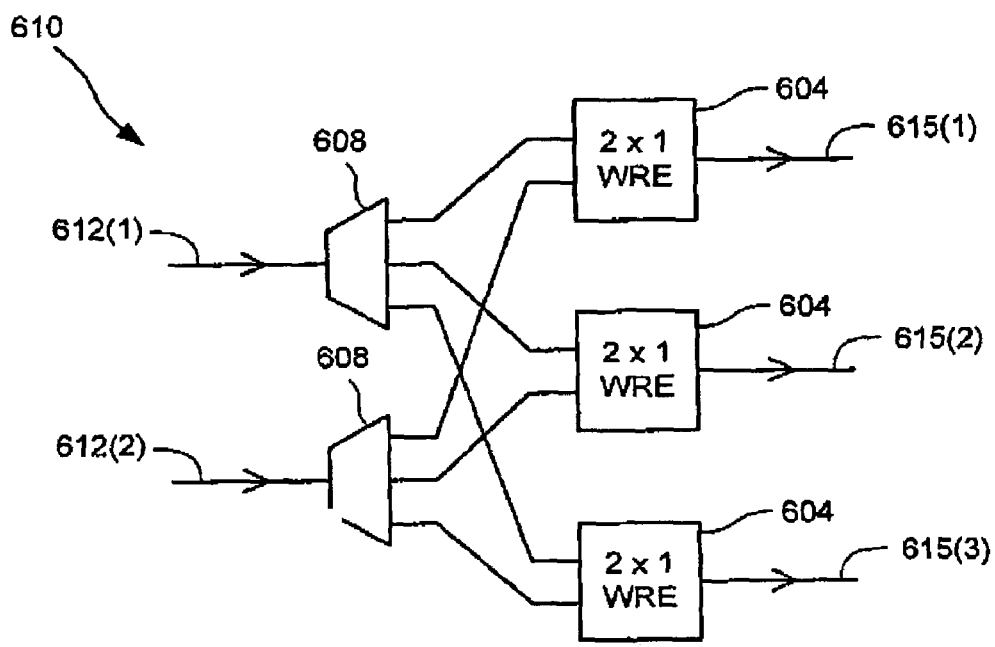
FIGS. 6A–6I are schematic diagrams showing examples of P×Q cross-connects that include wavelength routing elements in accordance with embodiments of the invention.
Figure 6B:
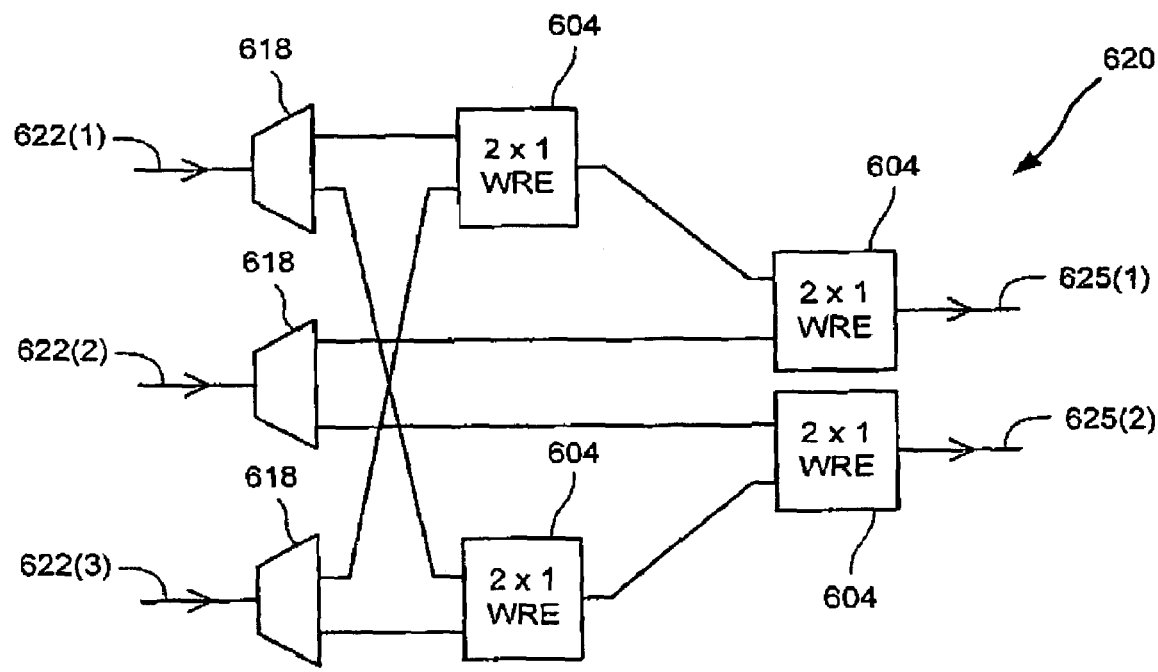

4. Optical Wavelength Cross Connects a. Broadcast-and-Select Optical Wavelength Cross Connects FIGS. 6A and 6B provide examples respectively of 2×3 and 3×2 cross connects. The illustrated embodiments use combinations of 2×1 WREs, which may be configured as described in the '061 application or otherwise, and optical splitters. The embodiment shown in FIG. 6A functions as a 2×3 cross connect that maps spectral bands from two input optical signals 612 according to a wavelength grid onto three output signals 615. Each of the input optical signals 612 encounters a 1:3 optical splitter 608 connected with three 2×1 WREs 604. This arrangement thus provides a duplicate of both input signals 612 to each of the 2×1 WREs 604, each of which is configured to select the desired spectral bands for its corresponding output signal 615. Notably, this arrangement permits any combination of the spectral bands available from either of the input signals 612 to be included on any of the output signals 615, subject to the constraint imposed by the wavelength grid. Thus, for example, the specific spectral band at $\lambda_0$ on the wavelength grid for, say, the first input signals 612(1), may be included on one, two, or even all three of the output signals depending on the configuration of the 2×1 WREs 604. It is even possible for all of the output signals 615 to include an identical set of selected spectral bands from the two input signals 612.

FIG. 6B provides an example of a 3×2 cross connects that operates on similar principles. Each of the three input signals 622 encounters a 1:2 optical splitter that directs duplicates of the input signals according to the arrangement illustrated in the figure. The routing of the duplicates with the illustrated set of 2×1 WREs permits each of the output signals 625 to include any desired combination of spectral bands from the input signals 622, subject to the wavelength-grid constraint and depending on the states of the 2×1 WREs. As for the arrangement shown in FIG. 6A for a 2×3 cross connect, a specific spectral band from any of the input signals may be included on any (or all) of the output signals if desired.

The architectures illustrated in FIGS. 6A and 6B are examples of a more general class of cross-connect architectures described herein as "broadcast-and-select architectures." A common feature of such architectures is that the input optical signals are duplicated with optical splitters, with a duplicate of each of the input signals being provided to a WRE, which may then be configured to select any of the desired spectral bands. There is therefore no constraint prohibiting a specific spectral band from any of the input signals from appearing on whatever number of output signals is desired. Such a capacity may be especially suitable for certain applications, including video applications among others. It should be noted that broadcast-and-select architectures may operate in the reverse direction, in which case the architecture may be referred to as a "distribute-and-combine" architecture.

b. K×K Bidirectional Optical Wavelength Cross Connects

Figure 6C:
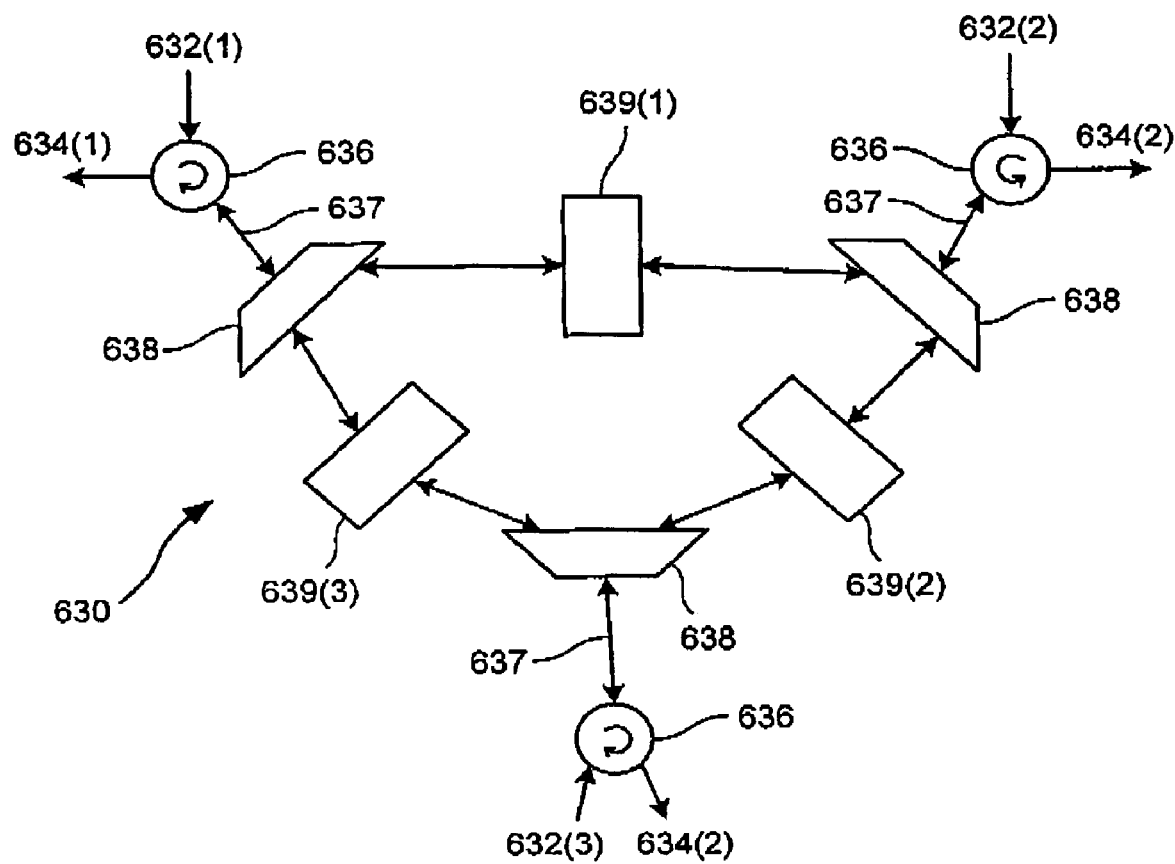

FIG. 6C provides an illustration of a 3×3 bidirectional optical wavelength cross connect 630. The cross connect 630 may be considered a member of the general class of K×K optical wavelength cross connects. However, this architecture demonstrates the concept that optical components such as those described herein may be used in bidirectional configurations where optical signals are transmitted through the components in opposite directions simultaneously. This allows cross connects to be both smaller and less expensive.

The optical wavelength cross connect 630 of FIG. 6C is a 3×3 bidirectional optical wavelength cross connect having three inputs 632 and three outputs 634. Circulators 636 permits input optical signals to be added and output optical signals to be removed from common transmission links 637 of the device. The circulators 636 may be integral with or external to the device. Three 1:2 couplers 638, split each input signal into substantially identical signals and route them to couplers 638 associated with the other two inputs. It will be understood that a 1:2 coupler is equivalently a 2:1 coupler in the reverse direction that combines, rather than splits, signals. Between each coupler pair in the arrangement, wavelength blockers 639 selectively block wavelengths from being transmitted. The wavelength blockers 639 may be, for example, 1×1 WREs with an OFF position or 2×1 WREs with an open connection. Thus, each input signal 632 is broadcast to the other inputs (outputs) and the wavelength blockers 639 select particular wavelengths to pass to the outputs, while the remaining wavelengths are blocked from the transmission. Other configurations are possible.

To illustrate the function of the cross connect 630, assume each input 632 may include 80 channels. If wavelength blocker 639(1) is configured to block channels 61–80, then channels 1–60 of the input 632(1) would appear at the output 634(2), while channels 1–60 of the input 632(2) would appear at the output 634(1). Channels 61–80 of input 632(3) could be selectively transmitted to either or both of outputs 634(1) and 634(2), depending on the configuration of wavelength blockers 639(3) and 639(2).

Figure 6D:
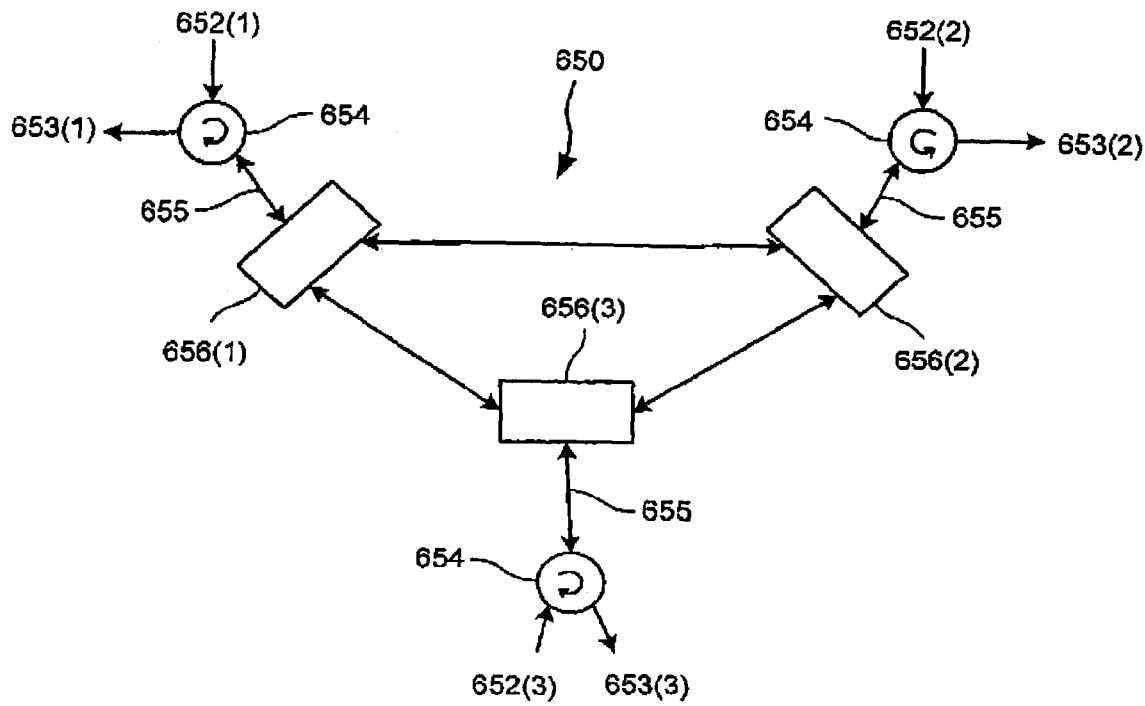

FIG. 6D provides another example of a 3×3 bidirectional optical wavelength cross connect 650. The cross connect 650 includes three inputs 652 and three outputs 653. Three circulators 654 permit input optical signals to be added and output optical signals to be removed from common links 655 of the device. Each of the three links 655 serves as an input in one direction and an output in the other direction to 2×1 (1×2) wavelength routing elements (WREs) 656. The WREs 656 may be configured as described in the '061 application or otherwise. Alternatively, the WREs 656 may be 1×3 WREs configured such that one of the outputs (inputs) is an OFF state.

To illustrate the function of the cross connect 650 of FIG. 6D, assume that each input 652 may include 80 channels. In this example, assume the WRE 656(1) is configured to direct channels 1–60 of the input 652(1) to the WRE 656(2) and channels 61–80 of the input 652(1) to the WRE 656(3). Assume further that the WRE 656(2) is configured to direct channels 1–40 of the input 652(2) to the WRE 656(1) and channels 41–80 of the input 652(2) to the WRE 656(3). Finally, assume that the WRE 656(3) is configured to direct channels 1–20 of the input 652(3) to the WRE 656(1) and channels 21–80 of the input 652(3) to the WRE 656(2). The result would be that the output 653(1) would include channels 1–40 of the input 652(2), the output 653(2) would include channels 1–40 of the input 652(1) and channels 41–80 of the input 652(3), and the output 653(3) would include channels 41–80 of the input 652(2). As is evident, because of the configuration of the WREs 656(1) and 656(3), no channels would pass through to the respective output from the opposite input. As mentioned previously, the WREs 656(2) may be 3×1 (1×3) WREs with one of the outputs (inputs) being an OFF state.

Figure 6E:
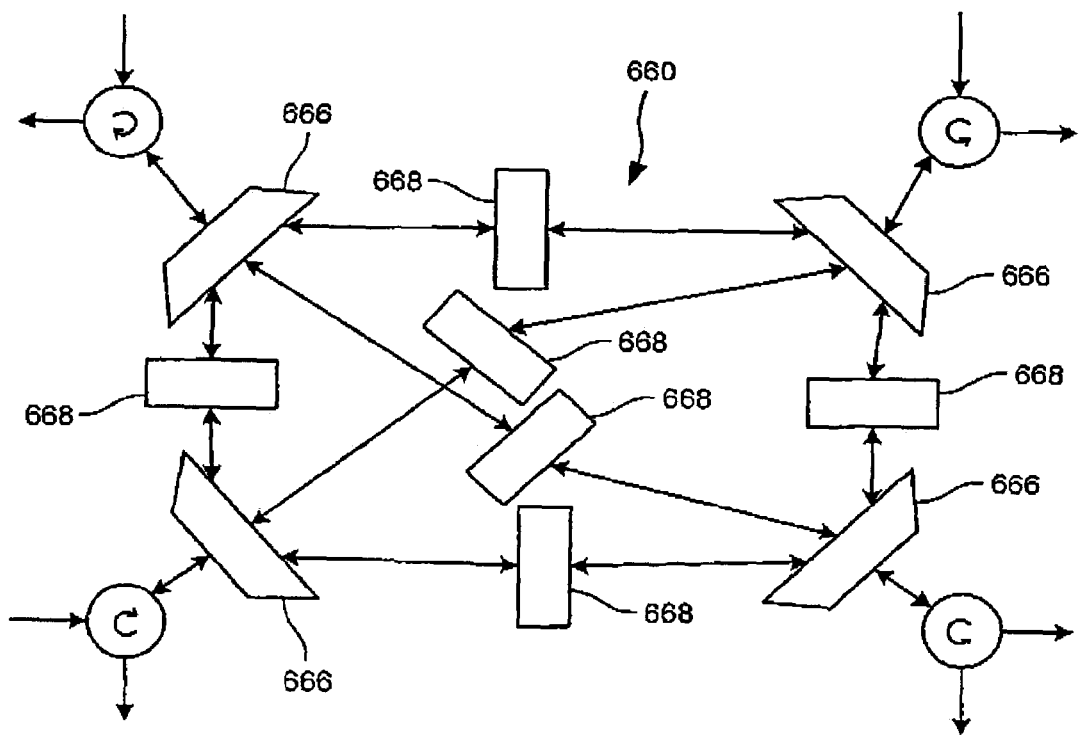

FIG. 6E provides an illustration of a 4×4 bidirectional optical wavelength cross connect 660 using wavelength blockers 668, as in the configuration of FIG. 6C. The cross connect 660 uses six wavelength blockers 668 (or 1×1 WREs), and four 1:3 couplers 666. Higher values of K are possible. In general, certain embodiments of the K×K optical wavelength cross connect using wavelength blockers would employ a plurality K of 1:(K−1) couplers, one associated with each input (output), and $$K\frac{(K-1)}{2}$$

wavelength blockers. Each coupler output (input) would be connected to an input (output) of each of the remaining couplers by way of a wavelength blocker. Some values of K may require amplification of signals, due to the number of times signals are divided. It is generally possible to add more optical components without altering the functionality of the arrangement.

Figure 6F:
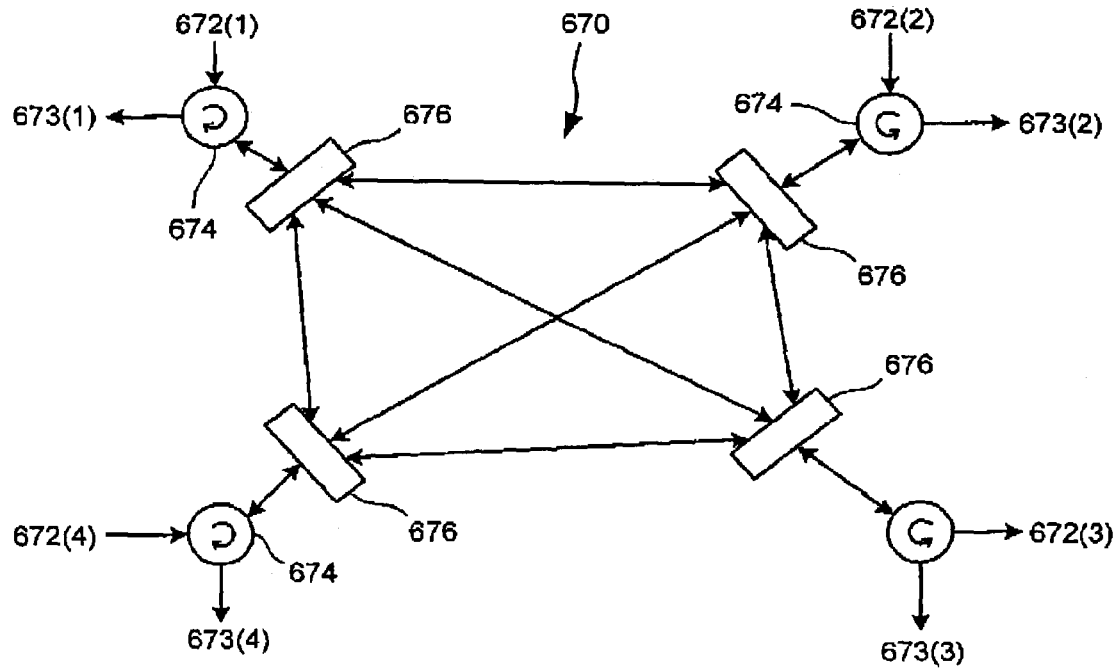

FIG. 6F provides an illustration of an exemplary 4×4 bidirectional wavelength cross connect 670 using 1×3 WREs 676 (or 1×4 WREs with an OFF position). The 1×3 WREs may be made up of 1×2 WREs, as explained previously with respect to FIGS. 5A–5D. The cross connect 670 includes inputs 672, outputs 673, and circulators 674.

Figure 6G:
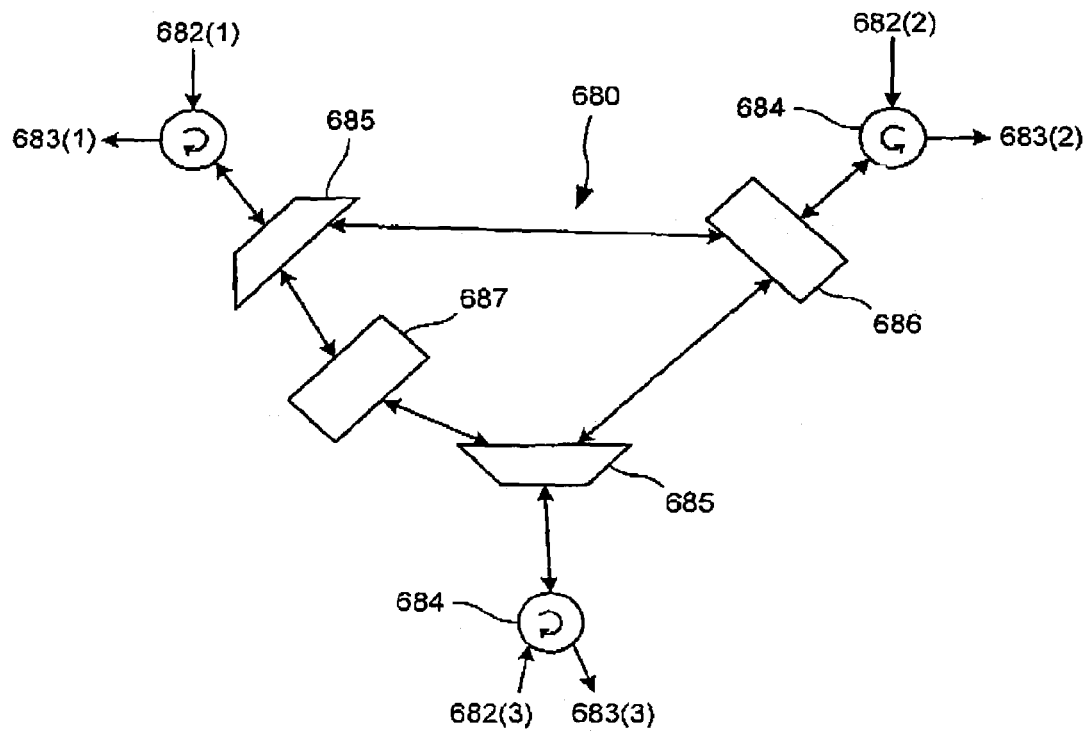

FIG. 6G provides an illustration of an exemplary 3×3 bidirectional optical wavelength cross connect 680 using a combination of couplers 685, a 1×2 WRE 686 and a wavelength blocker 687. The cross connect 680 includes inputs 682, outputs 683, and circulators 684.

Figure 6H:
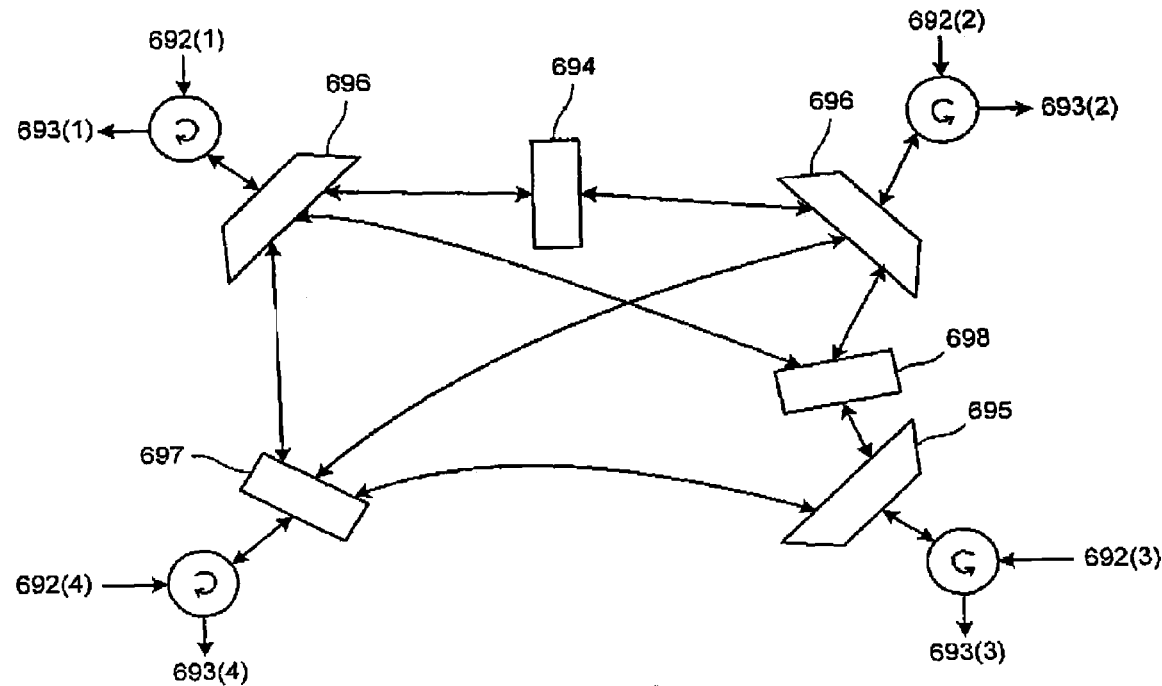

FIG. 6H provides an illustration of a 4×4 bidirectional optical wavelength cross connect 690 using a wavelength blocker 694, a 1:2 coupler 695, two, 1:3 couplers 696, a 3×1 WRE 697, and a 2×1 WRE 698. The cross connect 690 also includes inputs 692, outputs 693, and circulators 684. In some embodiments, it may be preferable to use (L+1)×1 WREs having an OFF state (e.g., leaving one of the L ports open), depending, for example, on the number of wavelength channels.

Figure 6I:
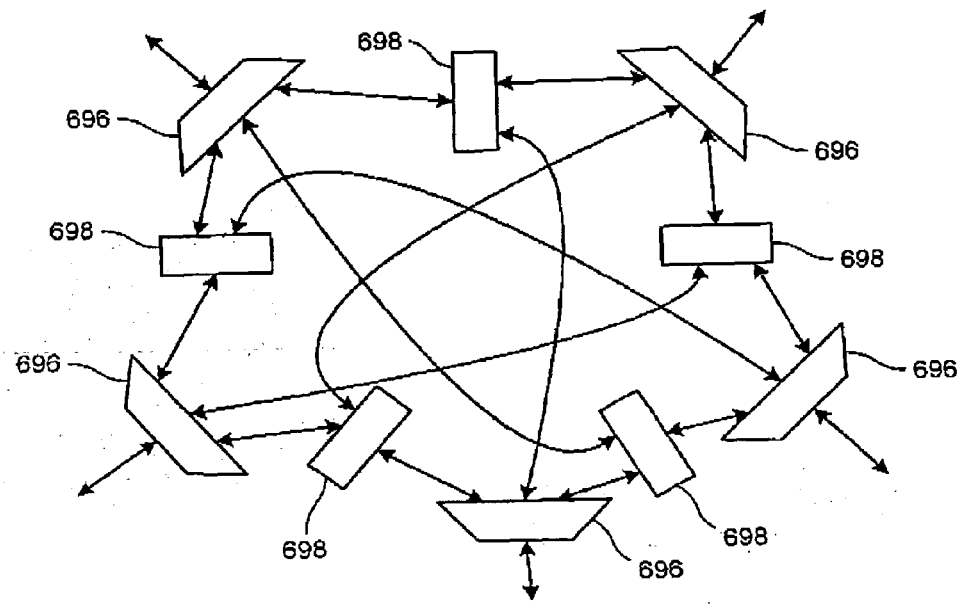

FIG. 6I provides an illustration of an exemplary a 5×5 bidirectional optical wavelength cross connect 699. The cross connect 699 is made up of 1:3 couplers 696 and 2×1 WREs 698 (3×1 WREs with an OFF position in some embodiments). Although not shown, it is understood that similar embodiments may include circulators either external to or integral with the device. Higher values of K are possible for K×K bidirectional wavelength cross connects using couplers in combination with WREs, in some of which cases, it may be preferable to provide signal amplification, depending, for example, on the value of K.

1. High-Reliability Embodiments

Figure 7:
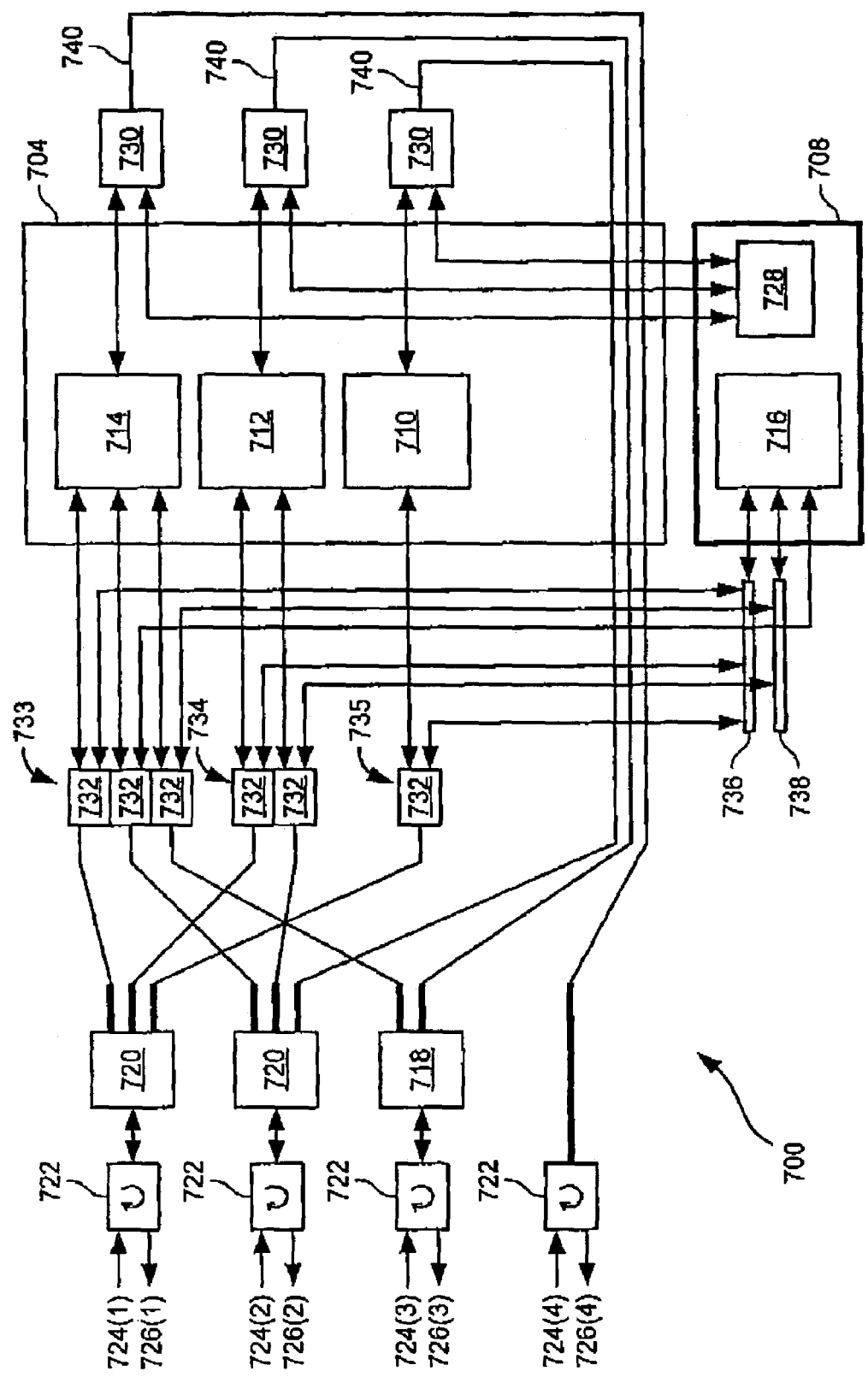
FIG. 7 is a schematic diagram showing a 4×4 optical wavelength cross-connect architecture, including a protection fabric, according to embodiments of the invention.

Certain K×K bidirectional wavelength cross connect architectures may be equipped with a protection capability. Providing protection capability to optical wavelength cross connects is described more fully in copending, commonly assigned U.S. patent application filed on Mar. 8, 2002, and assigned Ser. No. 10/093,844, entitled "OPTICAL WAVELENGTH CROSS CONNECT ARCHITECTURES USING WAVELENGTH ROUTING ELEMENTS," by Edward J. Bortolini, et al, which application has been incorporated herein by reference in its entirety. An example of such an architecture for a 4×4 cross connect 700 is illustrated in FIG. 7, although it is evident how the principles may be used for a K×K (or even P×Q) cross connect of any size. In FIG. 7, the cross connect 700 comprises a working fabric, denoted 704, and a protection fabric, denoted 708. The cross connect 700, without the protection fabric 708, provides the same functionality as the 4×4 WRE of FIG. 6H, although the embodiment is shown rearranged in FIG. 7, for ease of illustration. The working fabric includes a number of WREs, including a 1×1 WRE 710, a 2×1 WRE 712, and a 3×1 WRE 714 (the general solution provides a 1×1 WRE, a 2×1 WRE, . . . a (K−2)×1 WRE, and a (K−1)×1 WRE). The protection fabric 708 also includes a (K−1)×1 WRE 716. A 1:2 coupler 718 and two 1:3 couplers 720 route signals as shown to (from) either the working fabric 704 or the protection fabric 708, depending on the configuration of fiber switches, as explained further below. (The general solution includes one 1:2 coupler, one 1:3 coupler . . . one 1:K−2 coupler, and two 1:K−1 couplers). Circulators 722 add input signals 724 or remove output signals 726, as shown. Given the bidirectional nature of the cross connect 700, "input" or "inputs" may equivalently mean "output" or "outputs," respectively, in the reverse direction.

In the event of a failure in the system affecting one of the WREs 710, 712, 714 included on the working fabric 704, the protection WRE 716 may be configured to substitute for the WRE affected by the failure. Such substitution is accomplished with an arrangement of fiber switches. First, the protection fabric 708 comprises a 1×(K−1) fiber switch 728 that receives the output of the protection WRE 716 and directs it to one of K−1 fiber switches provided as 2×1 fiber switches 730. Each of these 2×1 fiber switches 730 may select between a signal received from an associated WRE 710, 712, 714 on the working fabric and a signal from the 1×K fiber switch 728 on the protection fabric, i.e. corresponding to a signal from the protection WRE. Second, $$\frac{K(K-1)}{2},$$

1×2 fiber switches 732, positioned for ease of illustration into three clusters 733, 734, 735 (K−1 clusters in the general case) select whether to route signals from the optical splitters 720, 718 to the working fabric 704 WREs 710, 712, 714 or to the protection fabric 708 WRE 716. Thus, all switches in a cluster are positioned to direct signals to either the working fabric 704 or to the protection fabric 708. Additionally, K−2 fiber switches 736, 738 select appropriate inputs to the protection fabric 728 WRE 716 (in the general case, the K−2 fiber switches include: a 2×1 fiber switch; a 3×1 fiber switch; ... a (K−2)×1 fiber switch; and a (K−1)×1 fiber switch).

Thus, in normal operation, each of the 2×1 fiber switches 730 is configured to transmit the optical signals received from its respective WREs 710, 712, 714 comprised by the working fabric 704 to transmission links 740. In the event of a failure affecting one of the working WREs 710, 712, 714, the switch 730 associated with the failed WRE and the switch 728 are configured such that the protection fabric 708 WRE 716 is connected to the appropriate link 740. Additionally, the fiber switches 732 in the cluster 733, 734, 735 associated with the failed WRE are positioned to route signals to the protection WRE 716. Finally, the fiber switches 736, 738 are configured to connect the appropriate cluster 733, 734, 735 to the protection WRE 716. It should be noted that the protection WRE 716 need receive only the number of inputs (transmit the number of outputs) to correspond to the working WRE being replaced.

2. In-service Upgrades

As explained more fully in previously incorporated U.S. patent application Ser. No. 10/093,844, entitled "OPTICAL WAVELENGTH CROSS CONNECT ARCHITECTURES USING WAVELENGTH ROUTING ELEMENTS," certain P×Q bidirectional optical wavelength cross connects having a protection fabric, such as the embodiment of FIG. 7, may be upgraded to embodiments having higher values of P and/or Q while the device remains in service. However, the ultimate values for P and/or Q may be limited by the size of the components initially installed (e.g., couplers 720).

3. K×K Bidirectional Optical Wavelength Cross Connects as OADMs

Figure 8A:
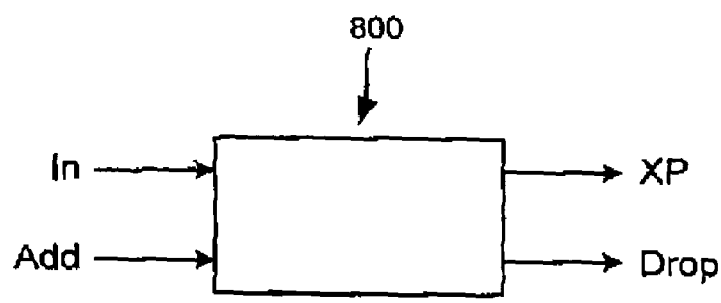
FIGS. 8A–E are schematic diagrams showing examples of K×K cross-connects, as Optical Add-Drop Multiplexers, using wavelength routing elements in accordance with embodiments of the invention.

K×K bidirectional wavelength cross connects may be used to perform the functions of optical add-drop multiplexers (OADMs). OADMs provide the capability to add or drop particular channels at intermediate points in a network. FIG. 8A illustrates an OADM or drop particular channels at intermediate points in a network. FIG. 8A illustrates an OADM 800, including the input ports (labeled "In" and "Add") and output ports (labeled "XP" and "Drop") typically associated with an OADM. The In port is the primary input port and the XP (express) port is the primary output port, although this in not necessarily the case. Channels to be added enter through the Add port, while channels to be dropped exit through the Drop port.

Figure 8B:
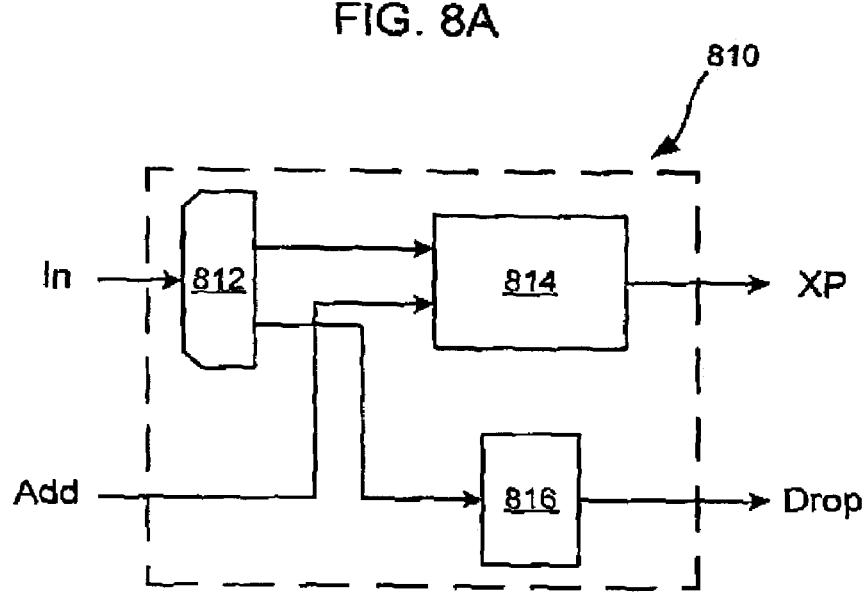

FIG. 8B provides a schematic illustration of one embodiment of a unidirectional OADM 810. The OADM 810 includes a 1:2 coupler 812, a 2×1 WRE 814 and a wavelength blocker 816 (1×1 WRE). The splitter 812 provides an equivalent of the input signal to both the WRE 814 and the wavelength blocker 816. The WRE 814 selects channels to output through the XP port from either the Add or In ports (via the coupler 812). The wavelength blocker 816 passes any of the channels from the In port to the Drop port, typically the same channels being added.

Figure 8C:
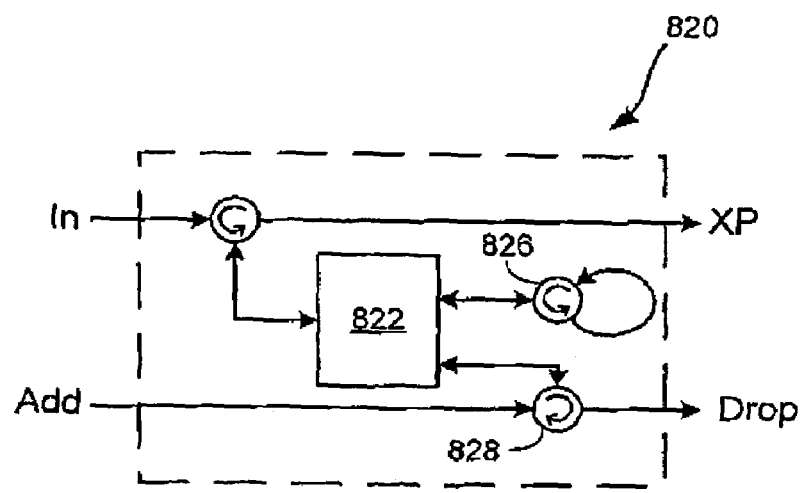

FIG. 8C provides a schematic illustration of a bidirectional OADM 820. The OADM 820 includes a 1×2 WRE 822 and three circulators 824, 826, 828. Through channels entering the In port are routed to the WRE 822 via the circulator 824. The WRE directs the through channels to the circulator 826, where the channels are rerouted back to the WRE 822, then to the circulator 824, before being directed to the XP port. The WRE 822 routes channels to be dropped to the Drop port via the circulator 828. Given the configuration of the WRE 822 to drop particular channels, channels having the same wavelength may be added by receiving the signals from the Add port via the circulator 828. The added signals are routed to the XP port via the circulator 824.

Figure 8D:
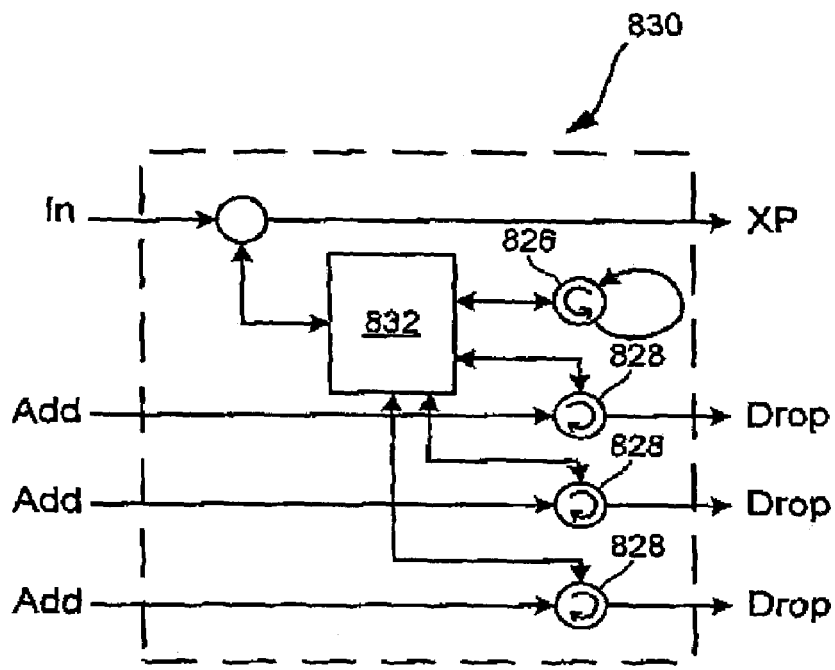

FIG. 8D illustrates another example of a bidirectional OADM 830, similar to the OADM of FIG. 8C, having multiple Add and Drop ports. A 1×4 WRE 832 is used in place of the 1×2 WRE of FIG. 8C to provide three Add and three Drop ports. In general, a 1×L WRE may be used as shown to provide an OADM having up to L−1 Add and L−1 Drop ports.

Figure 8E:
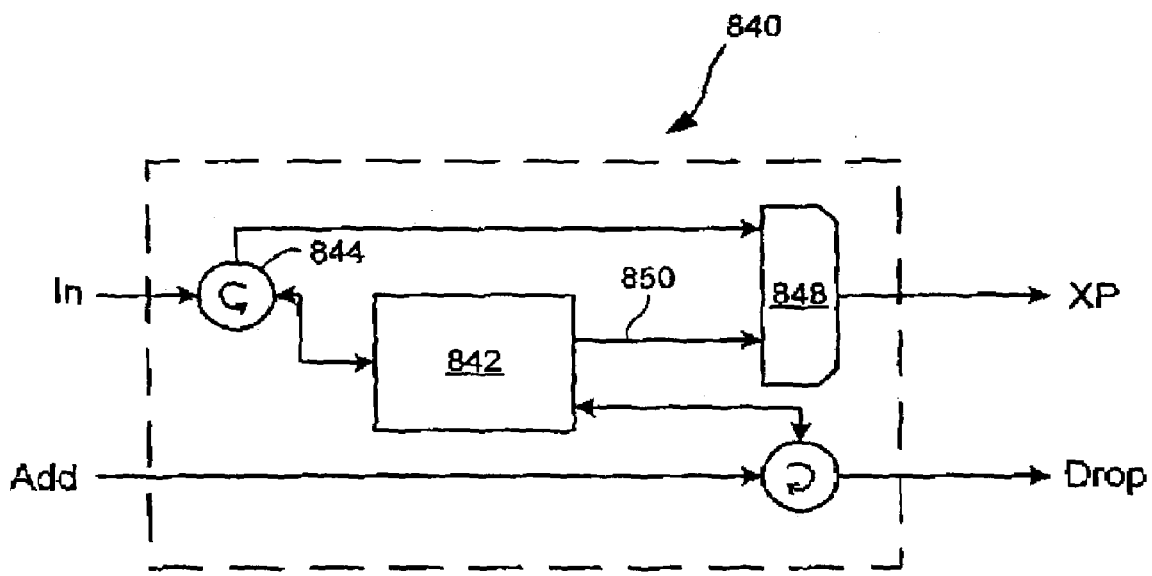

FIG. 8E provides a schematic illustration of another example of a bidirectional OADM 840. The OADM 840 includes a 1×2 WRE 842, circulators 844, 846, and coupler 848. Through channels enter the In port and are directed to the WRE 842 via the circulator 844. The WRE 842 directs the through channels to the coupler 848 via a transmission link 850. The WRE 842 directs channels to be dropped to the Drop port via the circulator 846. Channels to be added enter the WRE 842 via the circulator 846. The WRE 842 directs the added channels to the coupler 848 via the circulator 844. As with the embodiment of FIG. 8C, additional Add and Drop ports maybe included by providing 1×L WREs in place of the WRE 842 having values of L larger than 2.

Having described several embodiments, it will be recognized by those of skill in the art that various modifications, alternative constructions, and equivalents may be used without departing from the spirit of the invention. A number of alternative architectures have been provided as illustrations of specific embodiments, but it will be appreciated that these illustrations are not intended to be limiting and that there are various other alternative embodiments that are also within the scope of the invention. In particular, a number of examples have been provided illustrating discrete principles. Alternative embodiments may include elements in arrangements that use multiple of those principles. Accordingly, the above description should not be taken as limiting the scope of the invention, which is defined in the following claims.

What is claimed is:

1. A bidirectional wavelength cross connect, comprising:
a plurality of optically interconnected wavelength routing element, including at least one bidirectional wavelength routing elements, each of the plurality of optically interconnected wavelength routing elements being configured to multiplex selective ones of a plurality of spectral bands to output optical signals and to direct the output optical signals to one of a plurality of ports, including at least one bidirectional port;
wherein the spectral bands are comprised by a plurality of input optical signals, each input optical signal being received at respective ones of the plurality of ports, including the at least one bidirectional port.

2. The bidirectional wavelength cross connect of claim 1, further comprising at least one circulator disposed to:
receive one of the plurality of input optical signals;
route the one of the plurality of input optical signal to one of the ports;
receive from the one of the ports an output optical signal; and
transmit the output optical signal.

3. The bidirectional wavelength cross connect of claim 1, wherein at least one of the wavelength routing elements comprises a four-pass wavelength routing element.

4. The bidirectional wavelength cross connect of claim 1, wherein at least one of the wavelength routing elements comprises a two-pass wavelength routing element.

5. The bidirectional wavelength cross connect of claim 1, further comprising a plurality of optical couplers, each disposed to intercept one of the input optical signals and to transmit an equivalent of such one of the input optical signals to at least two of the plurality of wavelength routing elements.

6. The bidirectional wavelength cross connect of claim 1 wherein:
at least one of the plurality of wavelength routing elements is comprised by a protection fabric, and a remainder of the plurality of wavelength routing elements is comprised by a working fabric; and
the bidirectional wavelength cross connect further comprises at least one working optical switch configured to transmit an output optical signal either as a working signal received from the working fabric or as a protection signal received from the protection fabric.

7. The bidirectional wavelength cross connect of claim 6, wherein the protection fabric includes a protection optical switch disposed to transmit the protection signal to one of the working optical switches, depending upon a state of the protection optical switch.

8. The bidirectional wavelength cross connect of claim 6, wherein the at least one wavelength routing element comprised by the protection fabric is disposed to receive an equivalent of at least one of the input signals and to transmit the protection signal with spectral bands corresponding to desired spectral bands on an output optical signal, depending on the state of that wavelength routing element.

9. A bidirectional wavelength cross connect, comprising:
ports configured to receive input optical signals, including at least one bidirectional port, each input optical signal comprising a plurality of spectral bands, at least one of the bidirectional ports being disposed to transmit an output optical signal comprising at least one of the spectral bands; and
a plurality of optically interconnected wavelength routing elements, including at least one bidirectional wavelength routing element, each of the plurality of optically interconnected wavelength routing elements being configured to selectively route input optical signal spectral bands to output optical signals.

10. The bidirectional wavelength cross connect of claim 9, further comprising circulators, each circulator disposed to:
receive one of the input optical signals;
route the one of the input optical signals to one of the ports;
receive from the port one of the output optical signals; and
transmit the one of the output optical signals.

11. The bidirectional wavelength cross connect of claim 9, wherein at least one of the wavelength routing elements comprises a four-pass wavelength routing element.

12. The bidirectional wavelength cross connect of claim 9, wherein at least one of the wavelength routing elements comprises a two-pass wavelength routing element.

13. The bidirectional wavelength cross connect of claim 9, further comprising a plurality of optical couplers, each disposed to intercept one of the input optical signals and to transmit an equivalent of such one of the input optical signals to at least two of the plurality of wavelength routing elements.

14. The bidirectional wavelength cross connect of claim 9, wherein:
at least one of the plurality of wavelength routing elements is comprised by a protection fabric, and a remainder of the plurality of wavelength routing elements is comprised by a working fabric; and
the bidirectional wavelength cross connect further comprises a plurality of working optical switches, each configured to transmit a respective one of the output optical signals either as a working signal received from the working fabric or as a protection signal received from the protection fabric.

15. The bidirectional wavelength cross connect of claim 14, wherein the protection fabric includes a protection optical switch disposed to transmit the protection signal to one of the working optical switches, depending upon a state of the protection optical switch.

16. The bidirectional wavelength cross connect of claim 14, wherein the at least one wavelength routing element comprised by the protection fabric is disposed to receive an equivalent of at least one of the input signals and to transmit the protection signal with spectral bands corresponding to desired spectral bands on one of the output optical signals, depending on the state of that wavelength routing element.

17. A method of distributing a plurality of spectral bands, comprising:
receiving input optical signals at a plurality of ports, including at least one bidirectional port, the input optical signals comprising the spectral bands;
using a plurality of optically interconnected wavelength routing elements, including at least one bidirectional wavelength routing element, each of the plurality of optically interconnected wavelength routing elements being configured to selectively route input optical signal spectral bands to output optical signals, multiplexing selected spectral bands from the input optical signals onto a resultant output optical signal; and
transmitting the resultant output optical signal from one of the bidirectional ports.

18. The method of claim 17, further comprising optically splitting at least one of the input optical signals prior to multiplexing the selected spectral bands from the input optical signals.

19. The method of claim 17 wherein receiving comprises receiving from a circulator and transmitting comprises transmitting to a circulator.

20. The method of claim 17 wherein multiplexing comprises routing input optical signals through a wavelength routing element to output optical signals.

21. The method of claim 20 wherein one of the wavelength routing elements comprises a wavelength blocker.

22. The method of claim 17 wherein multiplexing comprises using wavelength routing elements to multiplex selected spectral bands from the input optical signals onto intermediate optical signals and optically combining the intermediate optical signals into the resultant output optical signal.

23. The method of claim 22 wherein one of the wavelength routing elements comprises a wavelength blocker.

24. A method of distributing a plurality of spectral bands, comprising:
receiving input optical signals at a plurality of ports, including at least one bidirectional port, the input optical signals comprising the spectral bands;
using a plurality of optically interconnected wavelength routing elements, including at least one bidirectional wavelength routing elements, each of the plurality of optically interconnected wavelength routing elements being configured to selectively route input optical signal spectral bands to output optical signals, selectively routing selected ones of the spectral bands; and
transmitting at least one of the spectral bands from one of the bidirectional ports.

25. The method of claim 24, further comprising multiplexing selected spectral bands from the input optical signals onto output optical signals and transmitting a resultant output optical signal from one of the ports.

26. The method of claim 25, further comprising optically splitting at least one of the input optical signals prior to multiplexing the selected spectral bands from the input optical signals.

27. The method of claim 25, further comprising:
optically splitting the input optical signals to produce equivalent optical signals;
receiving equivalent optical signals corresponding to each of the plurality of input optical signals at at least one protection wavelength routing element; and
multiplexing selected spectral bands received on the equivalent optical signals with the at least one protection wavelength routing element to produce a protection signal.

28. The method of claim 27, further comprising substituting the protection signal for one of the output optical signals to compensate for a fault.

29. A bidirectional wavelength cross connect for distributing a plurality of spectral bands, comprising:
a plurality of means for receiving input optical signals, including at least one bidirectional means for receiving input optical signals, the input optical signals comprising the spectral bands;
means for multiplexing selected spectral bands from the input optical signals onto a resultant output optical signal using, at least in part, a plurality of optically interconnected wavelength routing element, including at least one bidirectional wavelength routing elements, each of the plurality of optically interconnected wavelength routing elements being configured to selectively route input optical signal spectral bands to output optical signals; and
means for transmitting the resultant output optical signal from one of the bidirectional means for receiving input optical signals.

30. The bidirectional wavelength cross connect of claim 29, further comprising:
means for optically splitting at least one of the input optical signals.

* * * * *

UNITED STATES PATENT AND TRADEMARK OFFICE
CERTIFICATE OF CORRECTION

| | | |
|---|---|---|
| PATENT NO. | : 7,155,084 B2 | Page 1 of 1 |
| APPLICATION NO. | : 10/150810 | |
| DATED | : December 26, 2006 | |
| INVENTOR(S) | : Edward J. Bortolini et al. | |

It is certified that error appears in the above-identified patent and that said Letters Patent is hereby corrected as shown below:

Column 6, line 59, delete "230(A)" and insert --230(N)--

Column 14, claim 1, line 59, delete "element" and insert --elements--

Column 14, claim 1, line 60, delete "elements" and insert --element--

Column 18, claim 29, line 18, delete "element" and insert --elements--

Column 18, claim 29, line 19, delete "elements" and insert --element--

Signed and Sealed this

Third Day of April, 2007

JON W. DUDAS
*Director of the United States Patent and Trademark Office*